(12) United States Patent
Chen et al.

(10) Patent No.: US 8,480,137 B2
(45) Date of Patent: Jul. 9, 2013

(54) LOCKING DEVICE

(75) Inventors: Hung-Chi Chen, Taipei (TW); Chia-Te Tsao, Taipei (TW); Chung-Cheng Hua, Taipei (TW); Chong-Kuo Lai, Taipei (TW)

(73) Assignee: Compal Electronics, Inc., Taipei (TW)

( * ) Notice: Subject to any disclaimer, the term of this patent is extended or adjusted under 35 U.S.C. 154(b) by 792 days.

(21) Appl. No.: 12/336,551

(22) Filed: Dec. 17, 2008

(65) Prior Publication Data

US 2009/0302618 A1 Dec. 10, 2009

(30) Foreign Application Priority Data

Jun. 10, 2008 (TW) .............................. 97121566 A

(51) Int. Cl.
*E05C 1/04* (2006.01)
(52) U.S. Cl.
USPC ..................................... 292/150; 292/169.18
(58) Field of Classification Search
USPC ................. 292/196, 159, 150, 175, 140, 146, 292/302, 169.18 X
See application file for complete search history.

(56) References Cited

U.S. PATENT DOCUMENTS 6,094,949 A * 8/2000 Lagerberg et al. ................ 70/14
8,033,582 B2 * 10/2011 Sawatani et al. ................ 292/33

* cited by examiner

*Primary Examiner* — Carlos Lugo
*Assistant Examiner* — Mark Williams
(74) *Attorney, Agent, or Firm* — Jianq Chyun IP Office

(57) ABSTRACT

A locking device disposed on a casing and suitable for buckling up with a detachable object is provided. The locking device includes a base, an actuating element, and a driven latch. The base has a body fixed at the casing and a first slide track passing through the body. The actuating element has a first sliding block passing through the body and moves between a first position and a second position along a first axis via the first sliding block slidingly connected to the first slide track. The driven latch is slidingly disposed at the base and slides between a third position and a fourth position along a second axis. The driven latch and the actuating element are located at two opposite sides of the base. The driven latch has a second slide track and a locking portion. The first sliding block is slidingly connected to the second slide track.

4 Claims, 10 Drawing Sheets

LOCKING DEVICE

CROSS-REFERENCE TO RELATED APPLICATION

This application claims the priority benefit of Taiwan application serial no. 97121566, filed on Jun. 10, 2008. The entirety of the above-mentioned patent application is hereby incorporated by reference herein and made a part of specification.

BACKGROUND OF THE INVENTION

1. Field of the Invention

The present invention generally relates to a locking device, in particular, to a locking device suitable for buckling up with a detachable object.

2. Description of Related Art

With the rapid progress of technology, a variety of mobile electronic devices such as notebooks, personal digital assistants (PDAs), and pocket PCs have been developed, and electronic devices are no longer limited to those desk-top ones that can only be used on a table. Taking a notebook as an example, for the purpose of miniaturization and thinness, besides DDR modules and thermal modules inside the notebook, a locking structure for fixing the battery of the notebook also needs to be miniaturized.

A conventional locking structure of the battery of a notebook includes catches disposed on the casing of the notebook and capable of moving linearly. The catches retain the slots in the battery so as to secure the battery in the battery accommodation groove of the notebook. Moreover, a user may remove the battery from the battery accommodation groove of the notebook by releasing the structure interference between the catches and the slots. In particular, when the user intends to remove the battery from the battery accommodation groove of the notebook, a force should be applied in the same direction as the linear movement of the catches.

Due to the design of the spaces for disposing electronic elements or modules inside the notebook, the catches are generally bar-shaped to save the space, or the linear movement direction of the catches is changed so as not to interfere with the electronic elements or modules inside the notebook. However, the bar-shaped catches are difficult to be formed, and the change in the linear movement direction of the catches may cause inconveniences for the force application.

SUMMARY OF THE INVENTION

Accordingly, the present invention is directed to a locking device. When a user applies a force to an actuating element, a driven latch moves in a direction different from the force application direction.

The present invention provides a locking device disposed on a casing and suitable for buckling up with a detachable object. The locking device includes a base, an actuating element, and a driven latch. The base has a body fixed at the casing and a first slide track passing through the body.

The actuating element has a first sliding block passing through the body. The actuating element moves between a first position and a second position along a first axis by means of the first sliding block slidingly connected to the first slide track. The driven latch is slidingly disposed at the base and slides between a third position and a fourth position along a second axis. The driven latch and the actuating element are located at two opposite sides of the base. The first axis is perpendicular to the second axis. The driven latch has a second slide track and a locking portion. The first sliding block is slidingly connected to the second slide track.

When the actuating element is located at the first position, the driven latch is located at the third position, and the locking portion buckles up with the detachable object. When the actuating element is located at the second position, the driven latch is located at the fourth position, and the locking portion releases the detachable object.

In an embodiment of the present invention, the base further has at least one third slide track disposed at the body, and the driven latch has at least one first slide hook. The driven latch is slidingly disposed at the base by means of the first slide hook slidingly connected to the third slide track. The third slide track extends in a direction parallel to the second axis.

In an embodiment of the present invention, the first sliding block has a bump embedded in two opposite sides of the first slide track.

In an embodiment of the present invention, the base further has at least one fourth slide track, and the actuating element further has at least one second slide hook. The fourth slide track passing through the body is located adjacent to the first slide track, and extends in a direction parallel to the first axis. The second slide hook is slidingly connected to the fourth slide track.

In an embodiment of the present invention, the second slide track extends in a direction forming an acute angle with the first axis.

In an embodiment of the present invention, the detachable object is a battery module.

In the locking device of the present invention, the actuating element moves along the first axis, the driven latch moves along the second axis, and the first axis is perpendicular to the second axis. Therefore, compared with the prior art, when the locking device is disposed on a casing, the direction of a force applied to the actuating element is different from the moving direction of the driven latch. As a result, in the case of not affecting the force application habit of the user, the moving direction of the driven latch can be changed without interfering with the disposition of other elements inside the casing, and the driven latch does not need to be designed in a shape that is difficult to be manufactured. In view of the above, the locking device of the present invention has a better applicability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
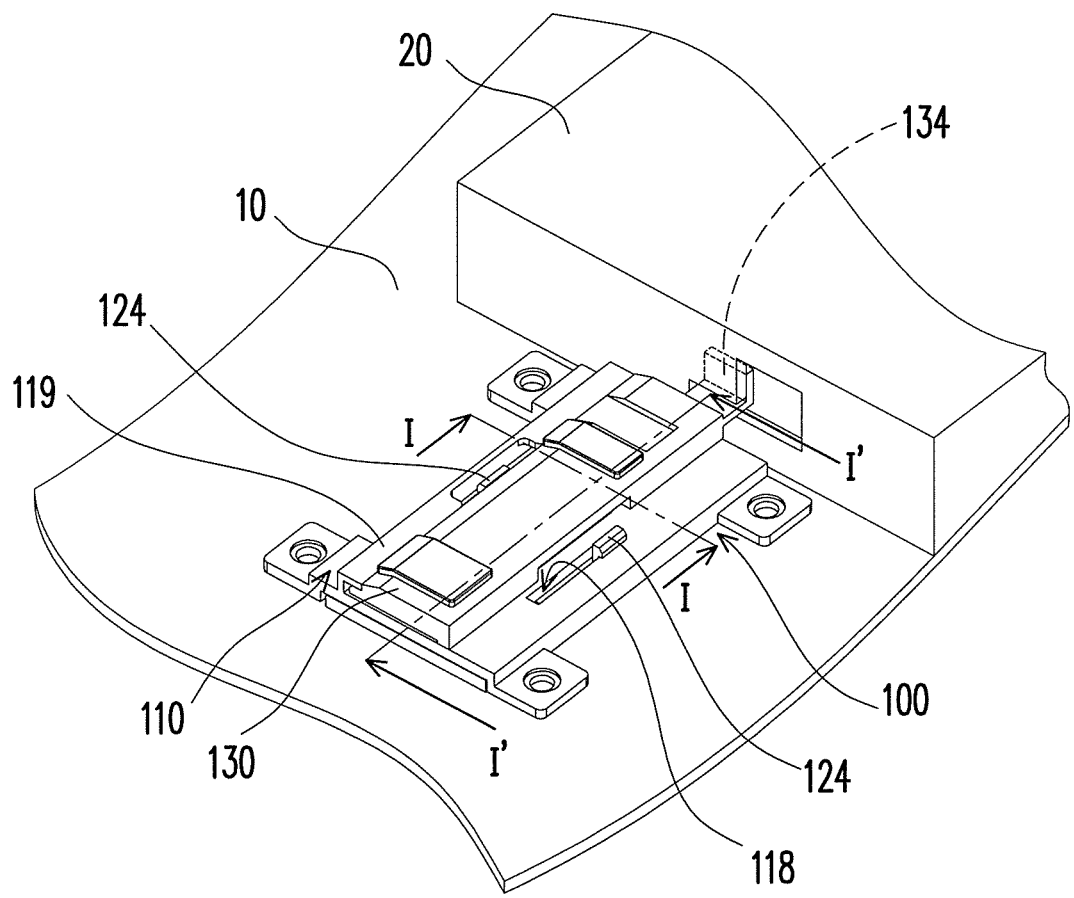
FIG. 1A is a schematic three-dimensional view of a locking device buckling up with a detachable object according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
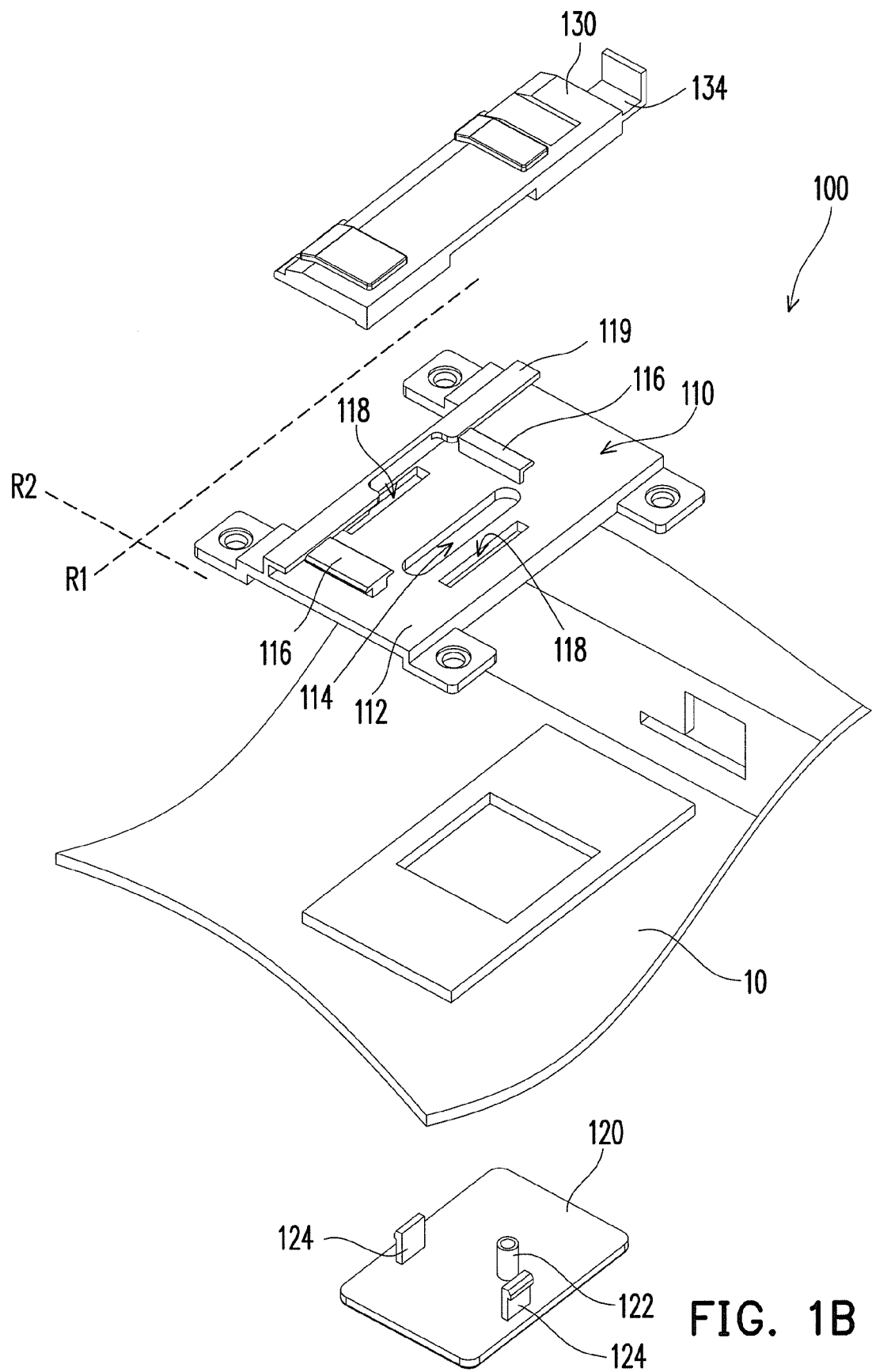
FIG. 1B is a schematic three-dimensional exploded view of the locking device and a casing in FIG. 1A.

FIG. 1A is a schematic three-dimensional view of a locking device buckling up with a detachable object according to an embodiment of the present invention, and FIG. 1B is a schematic three-dimensional exploded view of the locking device and a casing in FIG. 1A. Referring to FIGS. 1A and 1B, a locking device 100 of this embodiment includes a base 110, an actuating element 120, and a driven latch 130. The locking device 100 is disposed on a casing 10 and suitable for buckling up with a detachable object 20. It should be noted that, the casing 10 is, for example, the case of a notebook host, and the detachable object 20 is, for example, a battery.

Figure 1C:
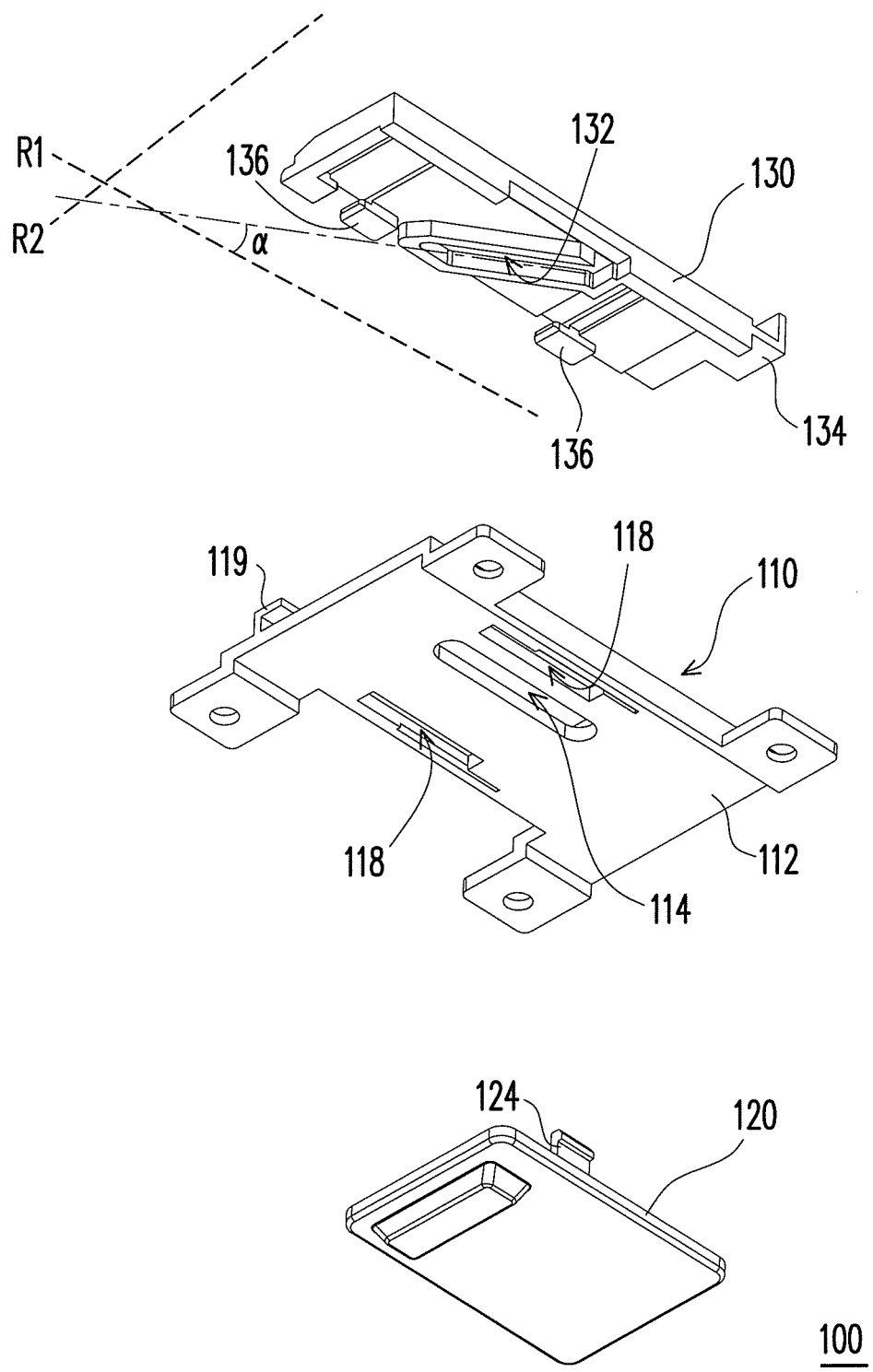
FIG. 1C is a schematic three-dimensional exploded view of the locking device in FIG. 1B from another viewing angle.
Figure 1D:
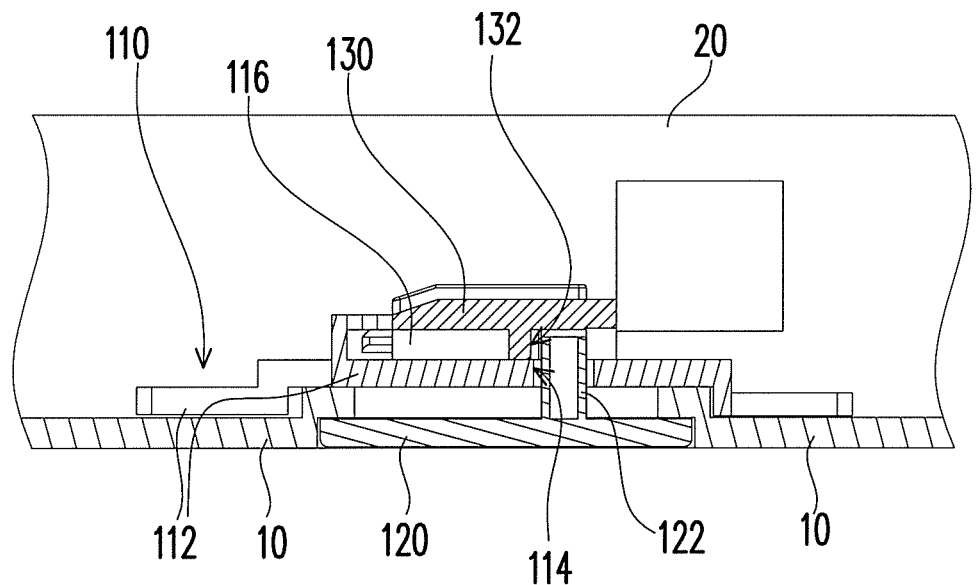
FIG. 1D is a cross-sectional view of the locking device in FIG. 1A taken along a line I-I.
Figure 1E:
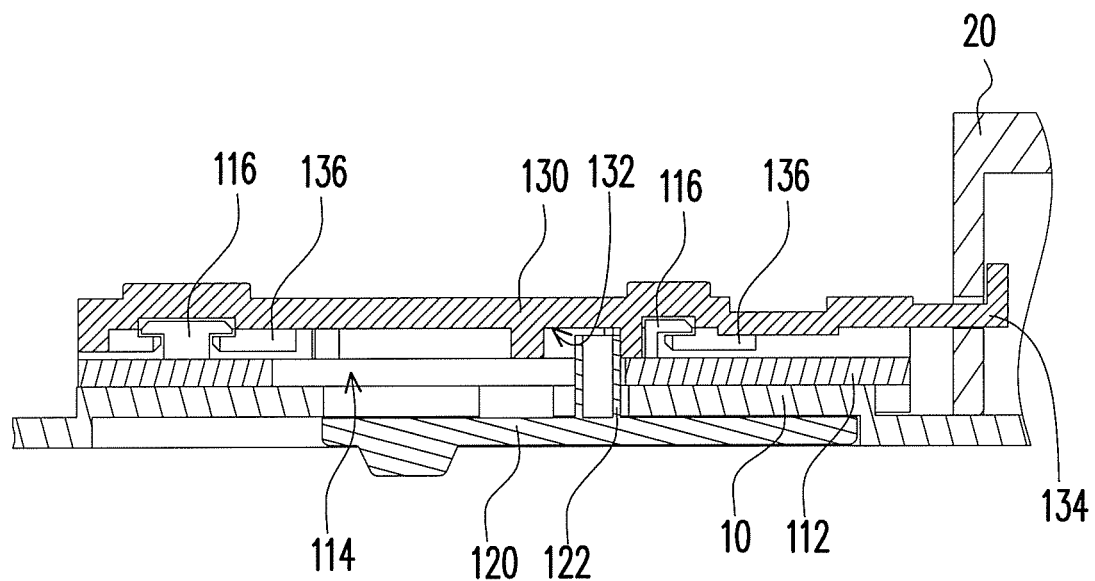
FIG. 1E is a cross-sectional view of the locking device in FIG. 1A taken along a line I'-I'.

FIG. 1C is a schematic three-dimensional exploded view of the locking device in FIG. 1B from another viewing angle, FIG. 1D is a cross-sectional view of the locking device in FIG. 1A taken along a line I-I, and FIG. 1E is a cross-sectional view of the locking device in FIG. 1A taken along a line I'-I'. Referring to FIGS. 1A, 1B, 1C, and 1D, the base 110 of the locking device 100 in this embodiment has a body 112 and a first slide track 114. The body 112 is fixed at the casing 10. The first slide track 114 extends in a direction parallel to a first axis R1 and passes through the body 112.

The base 110 of this embodiment further has at least one third slide track 116 (only two are schematically shown in FIG. 1B), at least one fourth slide track 118 (only two are schematically shown in FIG. 1B), and a position-limiting element 119. The third slide tracks 116 are disposed at the body 112 and extend in a direction parallel to a second axis R2. The fourth slide tracks 118 passing through the body 112 are located adjacent to the first slide track 114, and extend in a direction parallel to the first axis R1. The position-limiting element 119 is disposed on the body 112 and located at one end of each third slide track 116.

The actuating element 120 and the driven latch 130 are located at two opposite sides of the base 110. The actuating element 120 has a first sliding block 122 (as shown in FIG. 1B) passing through the body 112 and at least one second slide hook 124 (only two are schematically shown in FIG. 1B). The second slide hooks 124 are respectively slidingly connected to the fourth slide tracks 118. The driven latch 130 is slidingly disposed at the base 110 along the second axis R2. The first axis R1 is perpendicular to the second axis R2.

In particular, the driven latch 130 has a second slide track 132, a locking portion 134, and at least one first slide hook 136 (only two are schematically shown in FIG. 1C). The second slide track 132 extends in a direction forming an acute angle α with the first axis R1, and the first sliding block 122 is slidingly connected to the second slide track 132. In other words, the first sliding block 122 is slidingly connected to the second slide track 132 via the first slide track 114. In addition, referring to FIGS. 1C and 1E, the driven latch 130 is slidingly disposed at the base 110 by means of the first slide hooks 136 respectively slidingly connected to the third slide tracks 116.

Figure 2A:
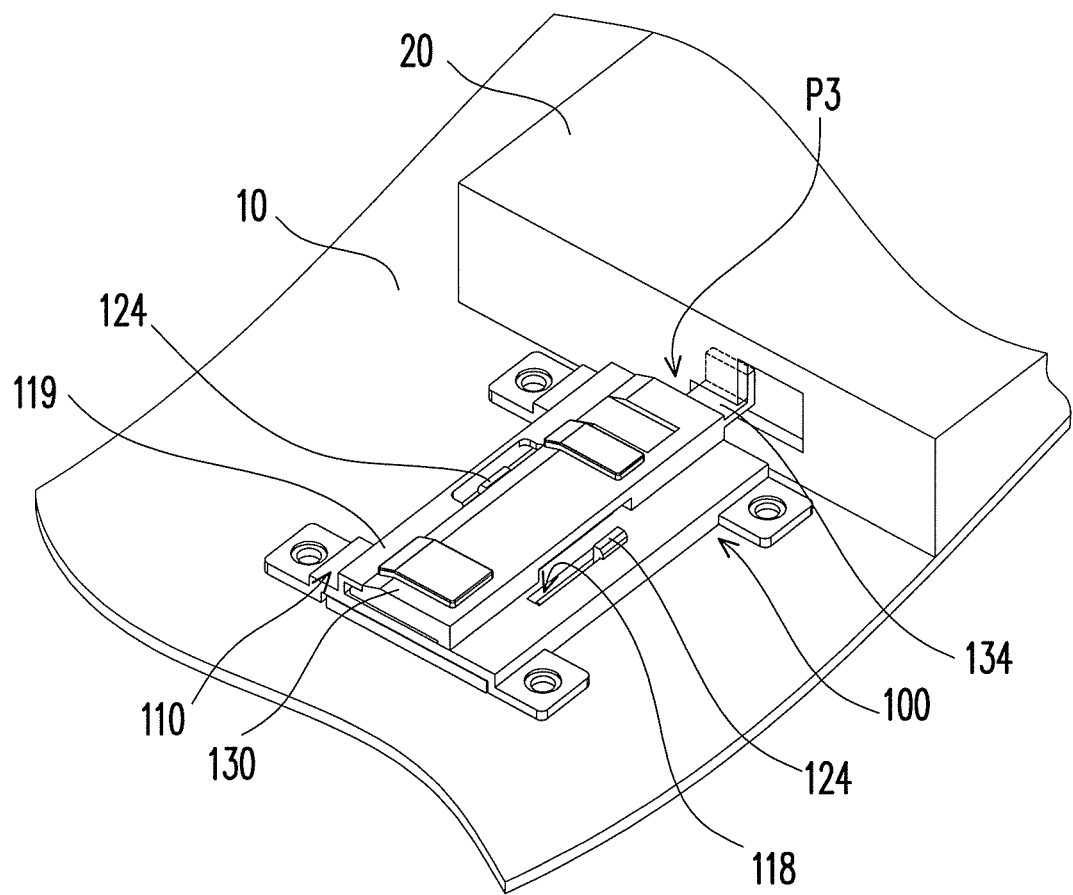
FIG. 2A is a schematic three-dimensional view of a locking device buckling up with a detachable object.
Figure 2B:
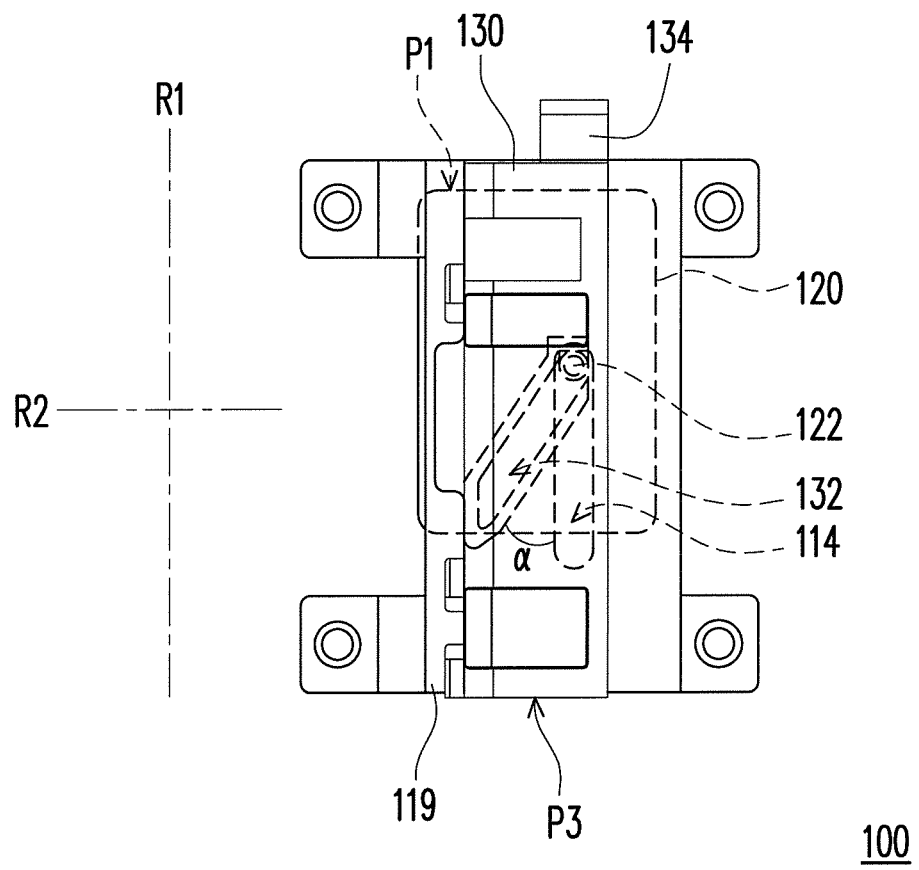
FIG. 2B is a schematic top view of the locking device in FIG. 2A.
Figure 3A:
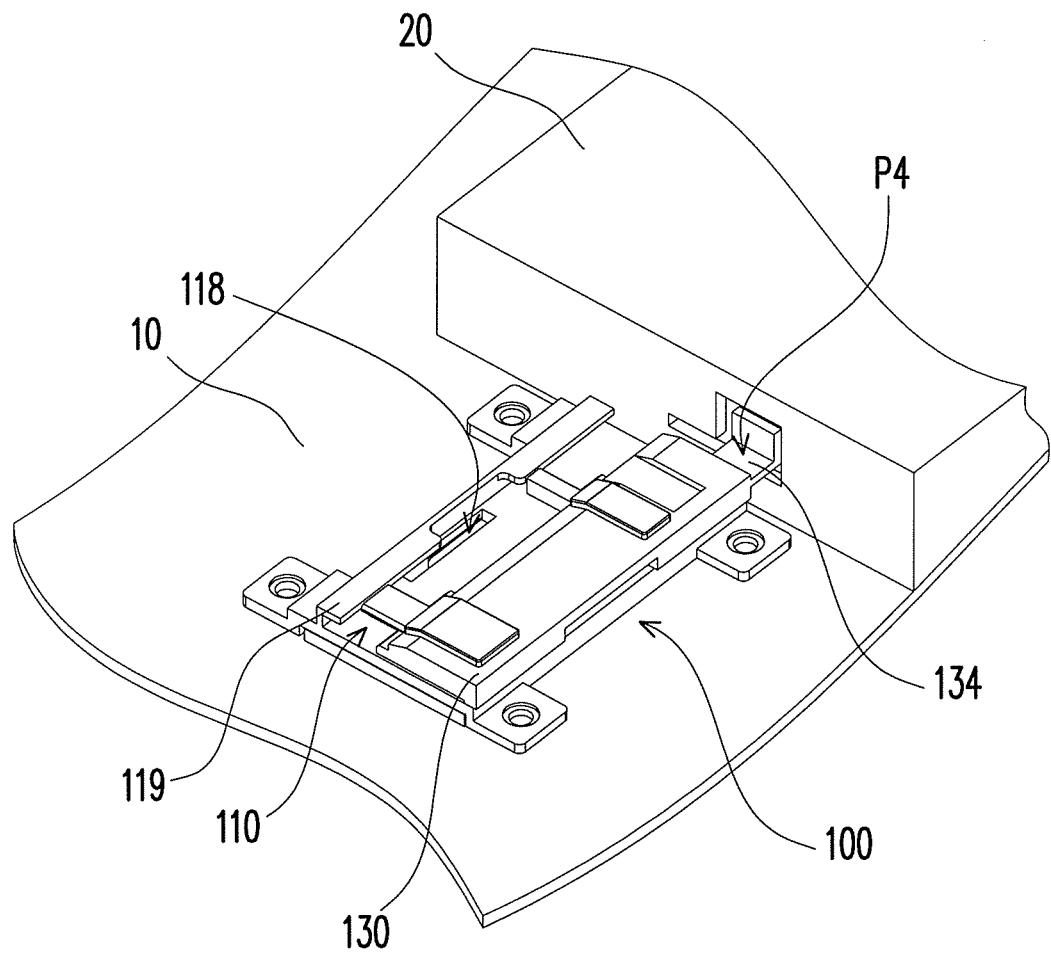
FIG. 3A is a schematic three-dimensional view of a locking device not buckling up with a detachable object.
Figure 3B:
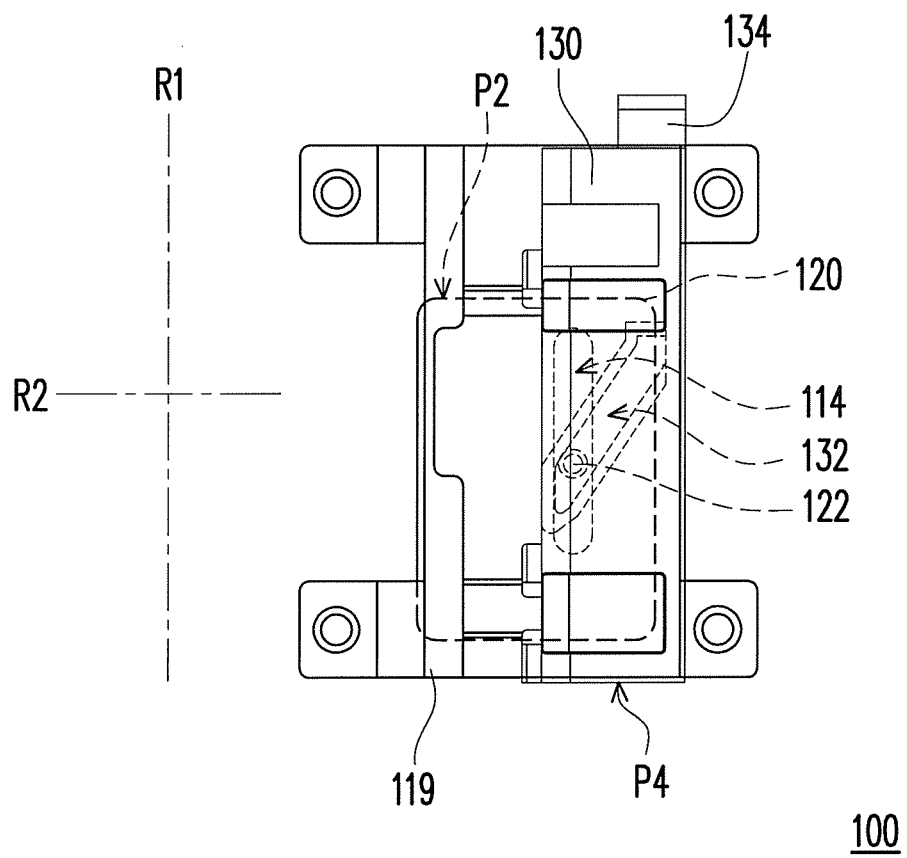
FIG. 3B is a schematic top view of the locking device in FIG. 3A.

Actuating processes of the locking device 100 buckling and not buckling up with a detachable object are described below. FIG. 2A is a schematic three-dimensional view of a locking device buckling up with a detachable object, FIG. 2B is a schematic top view of the locking device in FIG. 2A, FIG. 3A is a schematic three-dimensional view of a locking device not buckling up with a detachable object, and FIG. 3B is a schematic top view of the locking device in FIG. 3A. Referring to FIGS. 2A, 2B, 3A, and 3B, in short, the actuating element 120 moves between a first position P1 and a second position P2 along the first axis R1 by means of the first sliding block 122 slidingly connected to the first slide track 114 and the second slide hooks 124 respectively slidingly connected to the fourth slide tracks 118 (as shown in FIG. 1B). The driven latch 130 slides between a third position P3 and a fourth position P4 along the second axis R2 by means of the first slide hooks 136 respectively slidingly connected to the third slide tracks 116.

In particular, referring to FIGS. 2A and 2B, when the actuating element 120 is located at the first position P1, the driven latch 130 is located at the third position P3, the position-limiting element 119 interferes with the first slide hooks 136 (as shown in FIG. 1C), and the locking portion 134 buckles up with the detachable object 20, such that the detachable object 20 is fixed at the casing 10.

Referring to FIGS. 3A and 3B, when the actuating element 120 is located at the second position P2, the driven latch 130 is located at the fourth position P4, the first slide hooks 136 (as shown in FIG. 1C) move away from the position-limiting element 119, and the locking portion 134 does not buckle up with the detachable object 20, such that the detachable object 20 can be removed from the casing 10.

Moreover, when the actuating element 120 moves from the first position P1 to the second position P2 along the first axis R1, the first sliding block 122 slides along the first slide track 114 and relative to the second slide track 132 of the driven latch 130 so as to propel the driven latch 130, such that the driven latch 130 slides from the third position P3 to the fourth position P4 along the second axis R2.

Figure 4A:
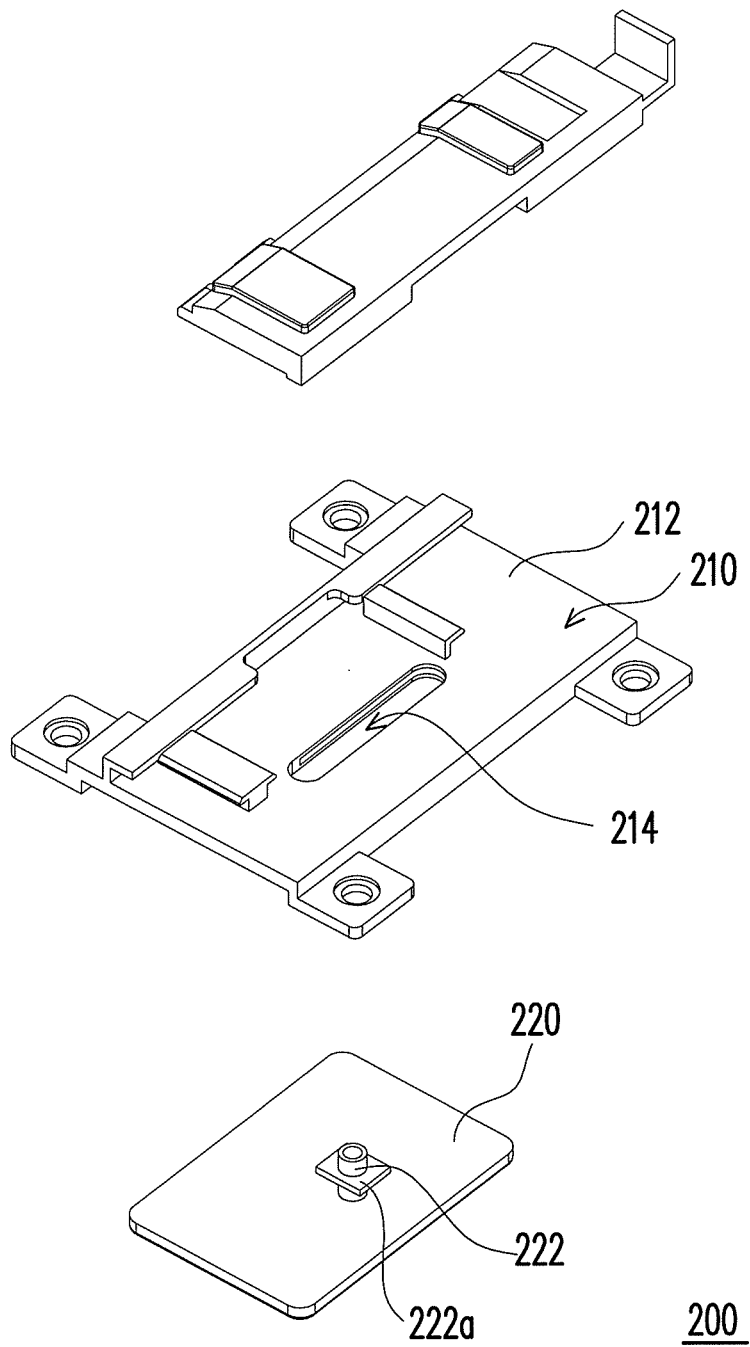
FIG. 4A is a schematic three-dimensional exploded view of a locking device according to another embodiment of the present invention.
Figure 4B:
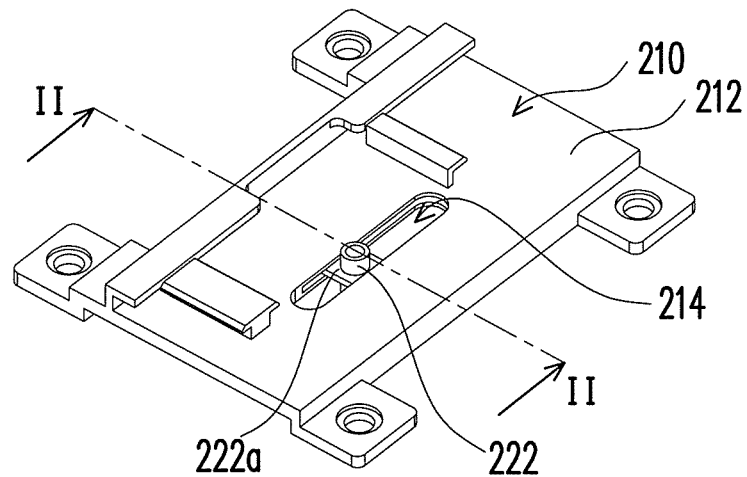
FIG. 4B is a schematic view of an actuating element slidingly connected to a base in FIG. 4A.
Figure 4C:
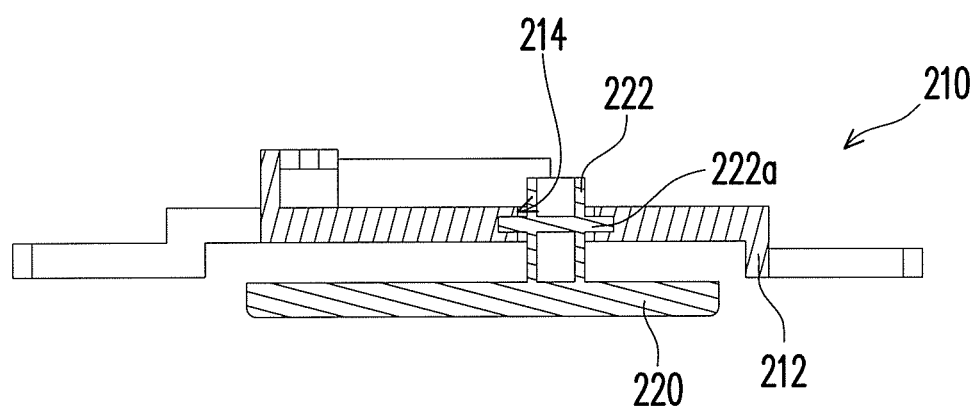
FIG. 4C is a cross-sectional view of the actuating element and the base in FIG. 4B taken along a line II-II.

FIG. 4A is a schematic three-dimensional exploded view of a locking device according to another embodiment of the present invention, FIG. 4B is a schematic view of an actuating element slidingly connected to a base in FIG. 4A, and FIG. 4C is a cross-sectional view of the actuating element and the base in FIG. 4B taken along a line II-II. Referring to FIGS. 4A, 4B, and 4C, an actuating element 220 of the locking device 200 in this embodiment has a first sliding block 222 passing through a body 212 of a base 210. The first sliding block 222 has a bump 222a. The bump 222a is embedded in two opposite sides of a first slide track 214 of the base 210, such that the actuating element 220 is slidingly connected to the first slide track 214. In other words, for the actuating element 220 of this embodiment, the disposition of the second slide hooks 124 (as shown in FIG. 1B) can be omitted.

In the locking device of the present invention, the actuating element moves along the first axis, the driven latch moves along the second axis, and the first axis is perpendicular to the second axis. Therefore, compared with the prior art, when the locking device is disposed on a casing, the direction of a force applied to the actuating element is different from the moving direction of the driven latch. As a result, in the case of not affecting the force application habit of the user, the moving direction of the driven latch can be changed without interfering with the disposition of other elements inside the casing, and the driven latch does not need to be designed in a shape that is difficult to be manufactured. In view of the above, the locking device of the present invention has a better applicability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A locking device in combination with a casing and a detachable object, the combination comprising:
   a base, the base comprising a body, a top surface, a bottom surface and at least one third slot hole and at least one fourth slot hole formed on the body, the body fixed at a casing, the top surface and the bottom surface facing opposite directions and a first slot hole formed on the body and the fourth slot hole and is located adjacent to the first slot hole and extends in a direction parallel to the first axis;
   an actuating element, the actuating element comprising at least one second slide hook and a first sliding block slidingly engaged with the first slot hole, wherein the second slide hook slidingly hook the fourth slot hole, and the actuating element moves between a first position and a second position along a first axis by means of the first sliding block slidingly connected to the first slot hole; and
   a driven latch, slidingly connected to the base and comprising at least one first slide hook and is slidingly disposed at the base by means of the first slide hook slidingly hooking the third slot hole, and the third slot hole extending in a direction parallel to the second axis, wherein the driven latch slides between a third position and a fourth position along a second axis, the driven latch and the actuating element are respectively located at the top surface and the bottom surface of the base, the first axis is perpendicular to the second axis, the driven latch comprises a second slide track and a locking portion, and the first sliding block is slidingly connected to the second slide track,
   wherein when the actuating element is located at the first position, the driven latch is located at the third position and the locking portion connects with a detachable object, and when the actuating element is located at the second position, the driven latch is located at the fourth position and the locking portion releases the detachable object.

2. The locking device according to claim 1, wherein the first sliding block comprises a bump embedded in two opposite sides of the first slide track.

3. The locking device according to claim 1, wherein the second slot hole extends in a direction forming an acute angle with the first axis.

4. The locking device according to claim 1, wherein the detachable object is a battery module.

* * * * *